(12) United States Patent
Bean

(10) Patent No.: US 10,776,331 B2
(45) Date of Patent: Sep. 15, 2020

(54) NORMALIZING COMPOUND ARTIFACT DEPENDENCY DATA

(71) Applicant: Red Hat, Inc., Raleigh, NC (US)

(72) Inventor: Ralph Bean, Rochester, NY (US)

(73) Assignee: Red Hat, Inc., Raleigh, NC (US)

( * ) Notice: Subject to any disclaimer, the term of this patent is extended or adjusted under 35 U.S.C. 154(b) by 142 days.

(21) Appl. No.: 15/823,097

(22) Filed: Nov. 27, 2017

(65) Prior Publication Data

US 2019/0163770 A1   May 30, 2019

(51) Int. Cl.
    *G06F 16/21*    (2019.01)
    *G06F 8/71*     (2018.01)
    *G06F 16/23*    (2019.01)
    *G06F 16/27*    (2019.01)
    *G06F 16/28*    (2019.01)

(52) U.S. Cl.
    CPC .............. *G06F 16/219* (2019.01); *G06F 8/71* (2013.01); *G06F 16/23* (2019.01); *G06F 16/27* (2019.01); *G06F 16/284* (2019.01)

(58) Field of Classification Search
    None
    See application file for complete search history.

(56) References Cited

U.S. PATENT DOCUMENTS

| | | |
|---|---|---|
| 7,904,480 B2 | 3/2011 | Palanisamy |
| 8,352,432 B2 | 1/2013 | Prahlad et al. |
| 9,552,380 B2 | 1/2017 | Mack |
| 9,747,188 B2 | 8/2017 | Srivastava |
| 9,946,971 B1 * | 4/2018 | Kannan ................ G06N 5/022 |
| 2012/0173591 A1 * | 7/2012 | Gershfang ............ G06Q 10/10 707/810 |
| 2016/0259834 A1 * | 9/2016 | Bishop .................... G06F 16/27 |
| 2017/0235816 A1 | 8/2017 | Livshits et al. |
| 2017/0286454 A1 * | 10/2017 | Saeki ...................... G06F 12/00 |
| 2017/0344363 A1 * | 11/2017 | Chen ................... G06F 16/9024 |

(Continued)

OTHER PUBLICATIONS

Koh, Judice L.Y, et al; "A Classification of Biological Data Artifacts"; http://citeseerx.ist.psu.edu/viewdoc/download?doi=10.1.1.136.2152&rep=rep1&type=pdf#page=58; Institute for Infocomm Research, 21, Heng Mui Keng Terrace, Singapore; National University of Singapore, School of Computing, Lower Kent Ridge Road, Singapore; Aug. 8, 2004; (5 Pages).

(Continued)

*Primary Examiner* — Mark D Featherstone
*Assistant Examiner* — Samuel C Sharpless, III
(74) *Attorney, Agent, or Firm* — K&L Gates LLP

(57) ABSTRACT

A build dependency tracking system includes a plurality of heterogeneous database, a dependency database, a monitoring system, an extraction system, and a database system. The monitoring system is configured to receive a successful build record from one of the plurality of heterogeneous databases corresponding to a build. The extraction system is configured to (i) extract an artifact from the successful build record associated with the build and (ii) extract a relationship from the successful build record indicating how the artifact relates to the build. The database update system is configured to store an indication of the artifact and the relationship in the dependency database.

20 Claims, 4 Drawing Sheets

(56) References Cited

U.S. PATENT DOCUMENTS

2018/0052682 A1* 2/2018 Fox .................... G06F 8/751

OTHER PUBLICATIONS

Havewala, Porus Homi; "Advanced Uses of Oracle Enterprise Manager 12c" http://www.oracle.com/us/products/enterprise-manager/wp-advanced-uses-em12c-1982907.pdf; Senior Manager at Oracle Corporation, Singapore; Aug. 2013; (44 Pages).
Nikolaos Konstantinou, Dimitrios-Emmanuel Spanos; "Creating Linked Data from Relational Databases" https://link.springer.com/chapter/10.1007%2F978-3-319-16074-0_4; National Technical University of Athens, Athens, Greece; © Springer International Publishing Switzerland 2015; Accessed Date: Oct. 10, 2017; (12 Pages).

* cited by examiner

NORMALIZING COMPOUND ARTIFACT DEPENDENCY DATA

BACKGROUND

Software may be developed using software development pipelines, which break the development process into discrete stages. Software development pipelines may be useful for integrating the development efforts of multiple, disparate teams that each work on separate portions of a product. While developing software in a pipeline, it may be useful to assemble multiple program components, or artifacts, into a single item for future development purposes. These assembled components may be referred to as a build. Software development pipelines may have multiple artifacts that originate from the disparate teams. Builds within these pipelines may depend on the artifacts in distinct ways. For example, a container build may depend on a package manager and a specification file. Accounting for these dependencies is important when predicting how changes in one artifact affect downstream builds.

SUMMARY

The present disclosure presents new and innovative methods and systems for documenting build dependencies. In an example, a method includes receiving a successful build record from one of a plurality of heterogeneous databases that corresponds to a build. Additionally, the method includes extracting an artifact from the successful build record associated with the build and extracting a relationship from the successful build record indicating how the artifact relates to the build. Further, the method includes storing an indication of the artifact and the relationship in a dependency database.

In another example, a system includes a plurality of heterogeneous databases that store build records and a dependency database that stores indications of (i) artifacts and (ii) relationships between artifacts and builds. The system includes a monitoring system configured to receive a successful build record from one of the plurality of heterogeneous databases corresponding to a build. The system further includes an extraction system configured to (i) extract an artifact from the successful build record associated with the build and (ii) extract a relationship from the successful build record indicating how the artifact relates to the build. Also, the system includes a database update system configured to store an indication of the artifact and the relationship in the dependency database.

In a further example, a computer readable medium stores instructions which, when executed by one or more processors, cause the one or more processors to receive, at a monitoring system, a successful build record from one of a plurality of heterogeneous databases that corresponds to a build. The instructions further cause the one or more processors to extract, at an extraction system, at least one artifact from the successful build record associated with the build. The instructions further cause the one or more processors to extract, at the extraction system, a relationship from the successful build record indicating how the artifact relates to the build. Also, the instructions cause the one or more processors to store, via a database update system, an indication of the artifact and the relationship in a dependency database.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
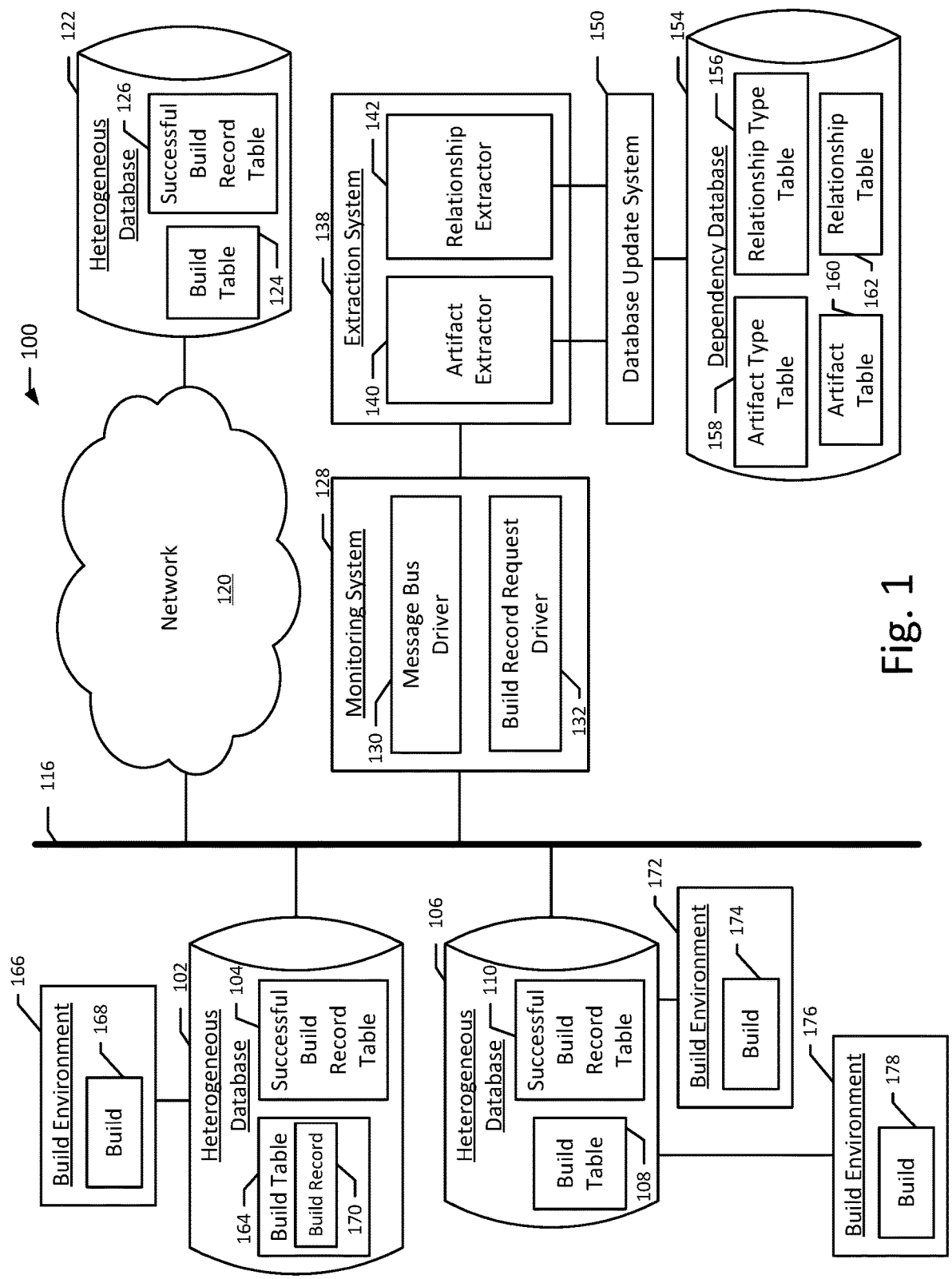
FIG. 1 illustrates a block diagram of an example computing system according to an example embodiment of the present disclosure.

Techniques are disclosed for documenting build dependencies. For example, the techniques disclosed in this application may be used to document the artifacts that a build is depends on. Often, when builds are performed in a software development pipeline, they depend on one or more artifacts in the build environment. For example, a package manager, such as an RPM Package Manager (RPM), may depend on the presence of a particular installation manager, such as a build spec file, or the presence of a particular file archive, such as a tar archive. These dependencies may be direct inputs into a build or may affect a build by influencing the build environment. Many of these dependencies are essential to the successful operation of the build in the future. Changes in one of the artifacts that a build depends on could disrupt future operation or cause other operating issues such as creating security vulnerabilities.

Typically, such dependencies are monitored locally, amongst closed product teams, but such local monitoring is manual, resulting in errors and omissions, and often unavailable or hard to find for other product teams in the pipeline. If a member of a software development team wants to assess the impact of changing an artifact, they obtain specialized details about each type of artifact and each kind of relationship to work through the interconnected build dependencies. Working through the interconnected build dependencies involves knowing the right members of disparate development teams to obtain the specialized details, which is slow and prone to error. To more accurately predict the issues that may be created by changing certain artifacts, the present disclosure describes a method for automatically monitoring successful builds, and extracting and storing the dependency information.

As described in the embodiments below, one method for accomplishing this may be to monitor the databases used by disparate development teams for records of their builds. These records may be designed by a closed product team, and the configuration details may include information on the artifacts present during a build and how the artifacts were used during the build.

These records may then be examined to determine which artifacts the build depended on. Examining the records for artifacts may include extracting specific details about which version of a particular piece of heterogeneous content is present during a build. The records may also be examined for how the artifacts that the build depends on relate to the build. The relationship can include details on whether a particular artifact is actively used in the build, or if the artifact is only present while the build occurred. The relationship may be extracted by extracting a relationship already recorded in the record, or may be extracted by examining the circumstances of the build. As discussed above, a single build may depend on multiple artifacts, so multiple artifacts may be extracted from a single successful build record.

The method may also store the extracted artifacts and relationships in a dependency database. The dependency database may be used as a central database to monitor the build dependencies from multiple heterogeneous databases and build environments. For example, the dependency database may aggregate the build dependencies from multiple closed product teams in a software development pipeline. Aggregating build dependencies may help reduce compatibility and security issues and may standardize and improve the consistency of the build dependencies tracked within a software development pipeline.

FIG. 1 depicts a hid-level block diagram of an example computing system 100 according to an example embodiment of the present disclosure. The computing system 100 may include one or more heterogeneous databases 102, 106, 122. Each heterogeneous database 102, 106, and 122 may correspond to an individual build environment or project team in a software development pipeline. For example, the heterogeneous database 102 may correspond to build environment 166 and the heterogeneous database 106 may correspond to build environments 172 and 176. As another example, there may be separate heterogeneous databases for tracking RPM builds (e.g., a BREW database), container builds (e.g., an OpenShift Build Service (OSBS) database), composer builds (e.g., a Peunji database), and cloud image builds (e.g., a Vaporizer database for Amazon® Machine Images). Multiple build environments or project teams may also be aggregated into a single heterogeneous database 102, 106, and 122 as appropriate.

The heterogeneous databases 102, 106, 122 may include build tables 164, 108, 124 and successful build record tables 104, 110, 126. The build tables 164, 108, 124 may include the build records, such as the build record 170, that correspond to successful or failed builds performed in the build environment 166, 172, 176. For example, build record 170 stored in build table 164 may correspond to build 168, which was performed in build environment 166. The successful build record table 104, 110, 126 may include records of successful builds completed in a build environment. These records may include details on artifacts present when the build was performed, including records of whether particular artifacts were directly used in the build or were present in the build environment during runtime or build time.

The heterogeneous databases 102, 106, 122 are connected to a central bus 116. The connections may be direct connections, such as for databases 102, 106, or may be indirect, such as the indirect connection for database 122 via the network 120, which may include a local area network, or the Internet. Similarly, the central bus 116 may be substituted for a network connection, such as a connection to the network 120.

The system 100 further includes a monitoring system 128 connected to the central bus 116. The connection between the monitoring system 128 and the central bus 116 may be direct, or may be over any suitable network, such as network 120. The monitoring system 128 includes a message bus driver 130 and a build record request driver 132. The message bus driver 130 may be configured to monitor the central bus 116 for indications of a successful build. If the message bus driver 130 detects a successful build, the message bus driver 130 may trigger further processing of the build as described elsewhere in this disclosure. Implementing the monitoring system 128 as a message bus driver may enable the monitoring system to react to and receive the successful build record in real time. The message bus driver 130 may be implemented as a daemon on a Unix® system. The build record request driver 132 may be configured to request successful build records from the heterogeneous databases 102, 106, 122. These requests may occur at fixed intervals, or in response to other system metrics, such as low system activity. The build record request driver 132 may be implemented by a time-based job scheduling utility, such as a timed cron task on a Unix® system. In another example, the monitoring system 128 may be implemented by configuring the heterogeneous databases 102, 106, 122 to generate a successful build record and transmit the successful build record to the monitoring system upon completion. For example, as described above, a heterogeneous database 102, 106, 122 may receive both successful and unsuccessful builds. Upon receiving a successful build, the heterogeneous database 102, 106, 122 may generate a successful build record and transmit the successful build record to the monitoring system 128 via the central bus 116.

The system 100 further includes an extraction system 138 connected to the monitoring system 128. The connection between the extraction system 138 and the monitoring system 128 may be direct, or may be over any suitable network, such as network 120. The extraction system 138 includes an artifact extractor 140 and a relationship extractor 142. The artifact extractor 140 is configured to extract one or more artifacts from the successful build record received by the monitoring system 128. The artifact extractor 140 may identify the portions of the successful build record that correspond to particular artifacts. This may include details on the name of an artifact as well as more specific information, such as a version number for the artifact. For example, the artifact extractor 140 may identify that a given artifact is the httpd server daemon, or that the artifact is httpd v2.4.6. The artifact extractor 140 may further determine an artifact type for the extracted artifacts. Example artifact types that the artifact extractor 140 may identify are: (i) package managers such as RPMs and OS trees; (ii) installation managers such as docker files, kickstarts, and specification files; (iii) image files such as Amazon® Machine Images and other VM images; (iv) containers such as LXC Linux containers; and (v) archives such as tar archives and Java archives.

The relationship extractor 142 is configured to extract relationships from the successful build record indicating how the artifacts relate to the build. These relationships may be expressly recorded in the successful build record, or may be ascertained by the relationship extractor 142 based on how the artifacts interact during the build. Example relationships that the relationship extractor 142 may extract are: (i) a package manager that depends on a specification file, such as an RPM that depends on a specification file; (ii) a package manager that depends on a file archive, such as an RPM that depends on a tar archive or an RPM that depends on a Java archive; (iii) a container that depends on an installation manager, such as a container that depends on a docker file; (iv) a container that depends on a package manager, such as a container that depends on an RPM; (v) a package manager that depends on a package manager, such as an OS tree that depends on an RPM; (vi) an installation manager that depends on an installation manager, such as a kickstart that depends on a specification file; or (vii) a package manager that depends on an installation manager, such as an OS tree that depends on a kickstart. The relationship extractor 142 may also extract further detail about how a build depends on the artifact. For example, the relationship extractor may extract relationships such as a package manager installed within a container, a package manager required at runtime for another package manager, a package manager required at build time for another package manager, an archive copied into a container, or an installation manager that contains necessary instructions for a build.

The artifact extractor 140 and the relationship extractor 142 may be implemented as one or more plugins. One example is a container plugin that extracts artifacts and/or relationships from an OSBS database. Another example is an RPM plugin that extracts artifacts and/or relationships from the buildroot details of an RPM stored in a BREW database. These plugins may be encoded with logic specific to a particular development team's business or artifact needs.

An individual build may typically have more than one dependency. For example, a container may have several package managers installed into the container, several archives copied into the container, and be built according to the instructions of an installation manager. Accordingly, the artifact extractor 140 may extract multiple artifacts from a successful build record and the relationship extractor 142 may extract multiple relationships that correspond with the multiple artifacts extracted by the artifact extractor 140.

The system 100 further includes a dependency database 154, which includes an artifact type table 158, an artifact table 160, a relationship type table 156, and a relationship table 162. The artifact table 160 may be configured to store indications of individual artifacts extracted by the artifact extractor 140. The indications of individual artifacts may include a description of what the artifact is, which may include version identification. The indications may also include a reference to a particular artifact type in the artifact type table 158. The artifact type table 158 may be configured to store indications of artifact types, such as the artifact types discussed above. The relationship table 162 may be configured to store indications of relationship between artifacts and builds extracted by the relationship extractor 142. These indications may identify an artifact, a build, and the relationship type between the artifact and the build. This relationship type may be specified by reference to an entry in the relationship type table 156. The relationship type table 156 may be configured to store indications of relationship types between builds and artifacts, such as the relationship types discussed above.

The system 100 further includes a database update system 150 connected to the artifact extractor 140, the relationship extractor 142, and the dependency database 154. The connections between the database update system 150, the artifact extractor 140, and the relationship extractor 142 may be direct, or may be over any suitable network, such as network 120. Likewise, the connection between the database update system 150 and the dependency database 154 may be direct, or may be over any suitable network, such as network 120. The database update system 150 may be configured to store indications of artifacts and relationships extracted from successful build records by the extraction system 138 in the dependency database 154. For example, the database update system 150 may be configured to store artifacts extracted from a successful build record by the artifact extractor 140 in the artifact table 160. The database update system 150 may also be configured to store relationships extracted from a successful build record by the relationship extractor 142 in the relationship table 162. In some configurations, the database update system 150 may store indications of artifact types and relationship types. For example, the database update system 150 may be configured to detect that the artifact type extracted by the artifact extractor 140 is a new artifact type not previously recorded in the artifact type table 158. In this example, the database update system 150 may then store an indication of the new artifact type in the artifact type table 158. In another example, the database update system 150 may be configured to detect that the relationship type extracted by the relationship extractor 142 is a new relationship type not previously recorded in the relationship type table 156. The database update system 150 may then store an indication of the new relationship type in the relationship type table 156. When storing indications of artifacts, artifact types, relationships, and relationship types, the database update system 150 may employ a REST/CRUD framework to interact with the dependency database 154. Alternatively, the database update system 150 may employ direct database access to interact with the dependency database 154.

The preceding examples distinguish between builds and artifacts as separate items. However, within particular software development pipelines, individual builds may themselves subsequently become artifacts on which future builds depend. For example, an RPM build may depend on instructions contained within a specification file and have a tar archive copied into the RPM build when built. A subsequent container build may then depend on this previously-built RPM. Thus, for the purposes of the container build the RPM would be an artifact in the artifact table. One of the benefits of a system for documenting build dependencies is that it automates the process of determining the downstream effects of changing a build on which other builds may depend. This application has particular utility for security updates, where it may be necessary to update an RPM to incorporate security fixes, but developers in the pipeline still need to identify which downstream items need to be reviewed or tested for compatibility.

Figure 2:
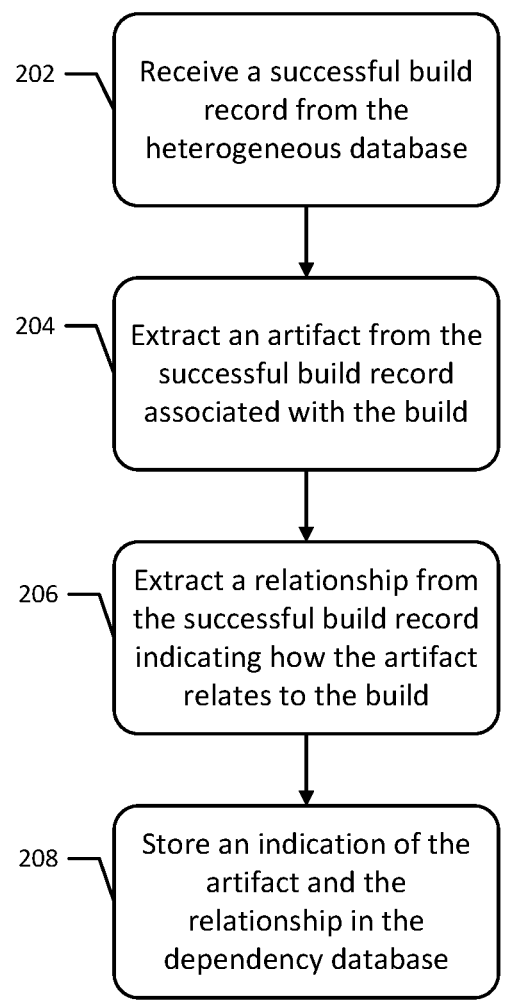
FIG. 2 illustrates a flowchart of an example method for documenting build dependencies according to an example embodiment of the present disclosure.

FIG. 2 depicts a flowchart of an example method 200 for documenting build dependencies according to an example embodiment of the present disclosure. The method may be implemented on a computer system, such as the system 100 in FIG. 1. The method 200 may also be implemented by a set of instructions stored on a computer readable medium that, when executed by a processor, cause the computer system to perform the method. Although the examples below are described with reference to the flowchart illustrated in FIG. 2, many other methods of performing the acts associated with FIG. 2 may be used. For example, the order of some of the blocks may be changed, certain blocks may be combined with other block, one or more of the blocks may be repeated, and some of the blocks described may be optional.

The method 200 may begin by receiving a successful build record from the heterogeneous database (block 202). For example, monitoring system 128 may receive a build record 170 from heterogeneous database 102. A successful build record may indicate that a build has successfully completed. The successful build record may be generated by a build environment 166 or by a heterogeneous database 102, 106, 122, upon receiving build record 170 from build environment 166, and determining that the build was a successful build. The successful build record may be received by a monitoring system, such as the monitoring system 128. For example, the message bus driver 130 of the monitoring system 128 may monitor a central bus 116 for indications of successful builds and receive a successful build record upon identifying a successful build. As another example, the build record request driver 132 may periodically request successful build records from the heterogeneous databases 102, 106, 122 and receive the successful build records in response to the request. Certain examples may also combine both the message bus driver 128 that monitors a central bus 116 and the build record request driver 132 that periodically requests successful build records in order to further ensure that no build records are missed.

The method 200 next proceeds with extracting an artifact from the successful build record associated with a build (block 204). For example, the extraction system 138 may extract an artifact from the successful build record via the artifact extractor 140. As discussed in greater detail above, an artifact may include pieces of heterogeneous content that a build 168, 174, 178 depends on, such as package managers, installation managers, image files, containers, and/or archives. The artifact may be extracted by analyzing the successful build record for information about artifacts present during or incorporated into the build. For example, the artifact extractor 140 may extract the artifacts by identifying this information in the successful build record and extracting the artifacts. The artifact may be extracted by an extraction system, such as the extraction system 138 and the artifact extractor 140.

The method 200 then proceeds with extracting a relationship from the successful build record indicating how the artifact relates to the build (block 206). For example, the extraction system 138 may extract a relationship from the successful build record via the relationship extractor 142. The relationship extracted may identify that a particular build 168, 174, 178 depends on an artifact, or may further document the kind of relationship as discussed above. The relationship may be extracted by analyzing the successful build record to determine how the build 168, 174, 178 relies on the artifact extracted. For example, the relationship may be extracted by determining that an artifact has to be copied or installed into the build 168, 174, 178, or that the artifact has to be present at build time or run time. The relationship may be extracted by an extraction system, such as the extraction system 138 and the relationship extractor 142.

The method 200 includes storing an indication of the artifact and the relationship in the dependency database (block 208). The indication may identify one or more of the artifact, the artifact type, the relationship, and the relationship type. Each of these may be stored in a separate table in the dependency database, such as the artifact table 160, the artifact type table 158, the relationship table 162, and the relationship type table 156 of the dependency database 154. The storing operation may be performed by the database update system 150. While storing the indication, the database update system 150 may also determine whether the artifact type is a new type of artifact not previously stored in the artifact type table of the dependency database or if the relationship type is a new type of relationship not previously stored in the relationship type table of the dependency database. In either case, the artifact type table and the relationship type table may be updated to include the new artifact type and relationship type, respectively.

Although descriptions and examples of the method 200 and its blocks are discussed in singular terms, this is only for simplicity and instructional purposes and should not be interpreted as limiting. Rather, in some embodiments, the method 200 may analyze multiple artifacts, relationships, or even builds at the same time and may perform certain blocks on more than artifact, relationship, or build before proceeding to the next block. For example, if a build record indicates that the build was dependent on four artifacts, block 204 may entail extracting all four of the artifacts before proceeding. Likewise, block 206 may entail extracting all four relationships before proceeding.

Figure 3:
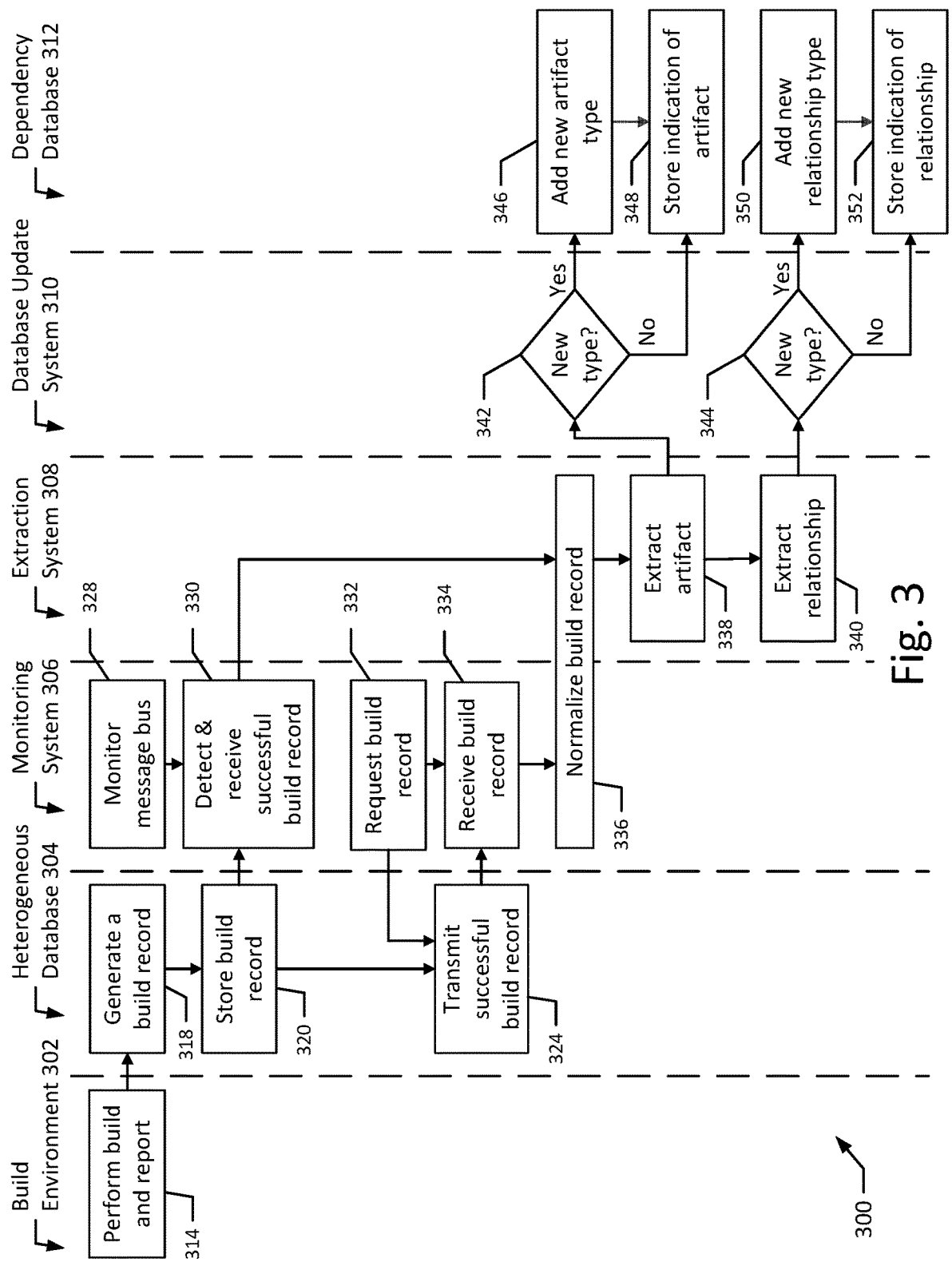
FIG. 3 illustrates a flow diagram of an example method for documenting build dependencies according to an example embodiment of the present disclosure.

FIG. 3 depicts a flow diagram of an example of documenting build dependencies according to an example embodiment of the present disclosure. Although the examples below are described with reference to the flowchart illustrated in FIG. 3, many other methods of performing the acts associated with FIG. 3 may be used. For example, the order of some of the blocks may be changed, certain blocks may be combined with other blocks, one or more of the blocks may be repeated, and some of the blocks described are optional. The methods may be performed by processing logic that may include hardware (circuitry, dedicated logic, etc.), software, or a combination of both. The example system 300 includes a build environment 302, a heterogeneous database 304, a monitoring system 306, an extraction system 308, a database update system 310, and a dependency database 312.

The method 300 may begin with the build environment 302 performing a build and reporting the build's results to the heterogeneous database 304 (block 314). For example, the build environment 302 may successfully complete a build and report information concerning the artifacts used in the build and present during the build to the heterogeneous database 304. In another example, the build environment 302 may fail to complete an attempted build, but still report the information concerning the artifacts used in the build and present during the build to the heterogeneous database 304. The build environment may be implemented as build environment 166, 172, 176.

Then the heterogeneous database 304 generates a build record (block 318). Upon receiving the information about the build from the build environment 302, the heterogeneous database 304 may generate a record including all of the information and then store the build record (block 320). The heterogeneous database 304 may be implemented as heterogeneous databases 102, 106, 122, discussed above with reference to FIG. 1.

Once the build record is stored, the monitoring system 306 may receive successful build records in several ways. First, for example, the monitoring system 306 may monitor the message bus for indications of a new successful build record (block 328). This may be implemented by the message bus driver 130. For example, when the heterogeneous database 304 stores a build record, the heterogeneous database 304 may send a signal indicating that the heterogeneous database 304 is storing a build record and that the build was successful via the central bus 116. The monitoring system 306 may detect this signal and use the signal to receive the successful build record (block 330) and proceed for further processing at block 336 as discussed below. A second way for the monitoring system 306 to receive the successful build record is to request a successful build record (block 332). This request may be implemented by the build record request driver and may be performed periodically, such as every hour. The heterogeneous database 304 then receives the request and transmits any successful build records that have occurred since the previous request (block 324). The monitoring system 306 receives the successful build record (block 334), and processing can continue at block 336 as discussed below. Certain example systems may only employ one of monitoring (e.g., block 328) or requesting (e.g., block 332) and either may be sufficient to receive the successful build records. Other example systems, however, may employ both monitoring (e.g., block 328) and requesting (e.g., block 332) concurrently to reduce the chances of missing a build record. The monitoring system 306 may be implemented as the monitoring system 128, including one or both of the message bus driver 130 and build record request driver 132.

The build record may then be normalized by either or both of the monitoring system 306 and the extraction system 308 (block 336). Normalizing the build record may consist of processing the build record from a format employed by one of the heterogeneous database 304 to one used by the dependency database 312. Normalizing the data ensures data consistency and compatibility, while also standardizing the extraction and database update steps that follow in the method. As an example, a BREW database for RPM builds may store build records in a JSON format, but the dependency database may store dependency data in a PostgreSQL format. As another example, an OSBS database for container build may store build records as image files, which need to be normalized before being processed by the extraction system 308 and stored in the dependency database 312.

Next, the extraction system 308 extracts one or more artifacts from the build record that correspond to the build (block 338). This extraction may be performed by analyzing the build record for indications of artifacts that were present or used during the build and may also include analyzing the artifact for an artifact type, such as an RPM or container. These operations may be implemented by the artifact extractor 140 of the extraction system 138. Once the artifacts are extracted, the database update system 310 determines whether the artifact type is a new artifact type not previously stored in the dependency database (block 342). The database update system 310 may do this by querying the artifact type table, such as the artifact type table 158 of the dependency database 154, for the artifact type and determining that the artifact type is a new artifact type if no results are returned. If the artifact type is new, the new artifact type is added to the dependency database 312 (block 346). This may be accomplished by storing the new artifact type in an artifact type table, such as the artifact type table 158. Once this is complete, an indication of the artifact is stored in the dependency database 312 (block 348). This may be accomplished by storing an indication of the new artifact in an artifact table, such as the artifact table 160. Returning back to block 342, if the database update system 310 determines that the artifact is not a new artifact type, then the method proceeds with block 348, where an indication of the artifact is stored as described above.

As an overall example of the processing at blocks 342, 346, and 348, consider two example build records, each containing an artifact dependency on an RPM. In the first of the two example build records, assuming the dependency database 312 has not previously stored an RPM, the database update system 310 would determine that the artifact type RPM is a new artifact type (block 342). Thus, the new artifact type RPM would be added to the dependency database 312 (block 346). After, an indication of the RPM artifact would be stored in the dependency database 312 (block 348). For the next build record, the dependency database 312 has now stored an RPM artifact type. While processing the second build, the database update system 310 would determine that there was no new artifact type (block 342) and would proceed directly to storing an indication of the second RPM artifact in the dependency database 312 (block 348).

The extraction system may then extract the relationship between the artifact and the build from the successful build record (block 340). This may be performed by analyzing the build record for information on how the artifact relates to the build. For example, the artifact may need to be installed in the build, or the artifact may need to be present at runtime. These operations may be implemented by the relationship extractor 142 of the extraction system 138. Once the relationships are extracted, the database update system 310 determines whether the relationship type is a new relationship type not previously stored in the dependency database (block 344). The database update system 310 may do this by querying a relationship type table, such as the relationship type table 156 of the dependency database 154, for the relationship type and determining that the relationship type is a new relationship type if no results are returned. If the relationship type is new, the new relationship type is added to the dependency database 312 (block 350). This may be accomplished by storing the new relationship type in a relationship type table, such as relationship type table 156. Once this is complete, an indication of the relationship is stored in the dependency database 312 (block 352). This may be accomplished by storing an indication of the new relationship in a relationship table, such as the relationship table 162. Returning back to block 344, if the database update system 310 determines that the relationship is not a new relationship type, then the method 300 proceeds with block 352, where an indication of the relationship is stored as described.

As an overall example of the processing at blocks 344, 350, and 352, consider two example build records, each containing a relationship where an artifact has to be present at build time for a build to succeed. In the first of the two build records, assuming the dependency database 312 has not previously stored a relationship where an artifact must be present at build time, the database update system 310 would determine that the relationship type "must be present at build time" is a new relationship type (block 344). Thus, the new relationship type "must be present at build time" would be added to the dependency database 312 (block 350). After, an indication of the relationship itself would be stored in the dependency database 312 (block 352). For the second of the two build records, the dependency database 312 has now stored the relationship type "must be present at build time" when processing the first build record. While processing the second build, the database update system 310 would then determine that there is no new artifact type (block 344) and would proceed directly to storing an indication of the second "has to be present at build time" relationship would be stored in the dependency database 312 (block 352).

Figure 4:
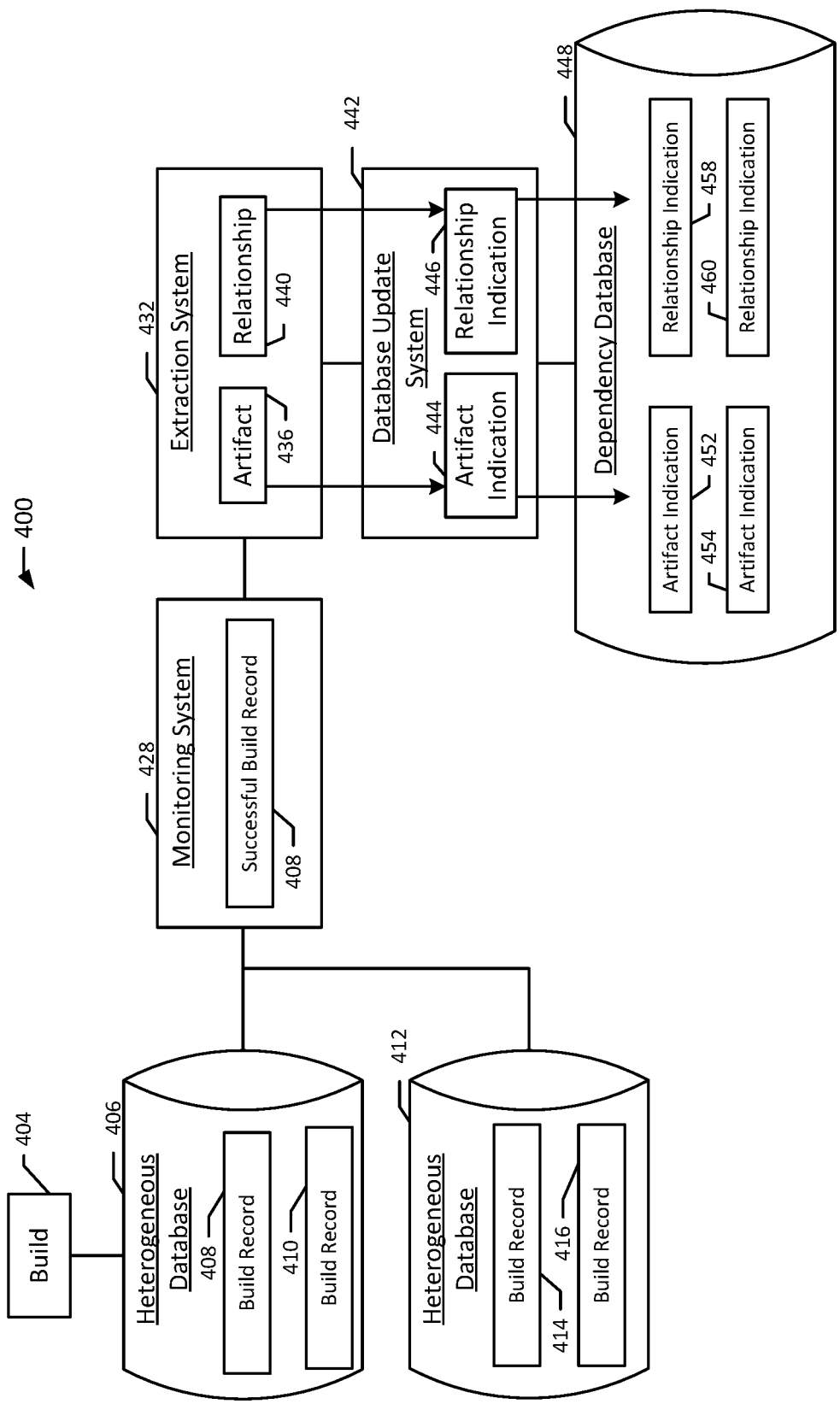
FIG. 4 illustrates a block diagram of an example system according to an example embodiment of the present disclosure.

FIG. 4 depicts a build dependency tracking system 400 according to an example embodiment of the present disclosure. The system 400 includes a plurality of heterogeneous databases 406, 412 that store build records 408, 410, 414, 416. The system 400 also includes a dependency database 448 that stores indications of artifacts 452, 454 and indications of relationships between artifacts and builds 458, 460. The system 400 also includes a monitoring system 428 configured to receive a successful build record 408 from one of the plurality of heterogeneous databases 406, 412 corresponding to a build 404. The system 400 further includes an extraction system 432 configured to (i) extract an artifact 436 from the successful build record 408 associated with the build 404 and (ii) extract a relationship 440 from the successful build record 408 indicating how the artifact 436 relates to the build 404. The system 400 also includes a database update system 442 configured to store an indication of the artifact 444 and an indication of the relationship 446 in the dependency database 448.

The centralized monitoring of build dependencies described in the present application is a technical solution to a technical problem with many benefits. As discussed above, to avoid issues such as security vulnerabilities, software compatibility, hardware downtime, crashes, and excessive re-executions, before changing a given artifact, it is important to assess the effects of changes to the artifact on other builds in the pipeline. A centralized dependency database enables teams to scope out a given project's impact on the rest of the software development pipeline by querying the dependency database for records of builds that depend on a given artifact and assessing any dependent builds for compatibility.

Further, by automating and centralizing the monitoring, such a method ensures greater accuracy and standardization in tracking dependencies. Rather than relying on disparate teams to perform the tracking, a centralized system can make the results available in a standardized format and with consistent detail, making future alterations to monitoring efforts easier to uniformly adjust.

Additionally, centralized monitoring enables teams to rebuild artifacts when certain artifacts or other parts of the system change. For example, if an artifact is updated to fix a security vulnerability, the centralized system makes it easier to identify and rebuild all of the builds that depend on the updated artifact to incorporate the fixed vulnerability. This helps improve computer security and build compatibility with future system improvements. Such a system could also improve the application binary interface (ABI), enabling developers to test a build earlier in the development process and check compatibility before building at runtime.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A computer-implemented method, comprising:
   receiving at a computer system via a network a successful build record that corresponds to a successful build from a first one of a plurality of heterogeneous databases;
   extracting with the computer system an identity of an artifact from the successful build record associated with the build, the artifact being an operating system virtualization container;
   extracting with the computer system a relationship from the successful build record indicating how the artifact relates to the build; and
   storing the identity of the artifact and the relationship in a dependency database;
   receiving at the computer system via the network a second successful build record that corresponds to a second successful build from a second one of a plurality of heterogeneous databases;
   extracting with the computer system a second identity of a second artifact from the second successful build record associated with the second build, the second artifact being a virtual machine image;
   extracting with the computer system a second relationship from the second successful build record indicating how the second artifact relates to the second build; and
   storing the second identity of the second artifact and the second relationship in the dependency database.

2. The method of claim 1, further comprising:
   the computer system monitoring a message bus in real time for successful build records.

3. The method of claim 1, further comprising:
   the computer system requesting successful build records from the first one and the second one of the plurality of heterogeneous databases.

4. The method of claim 3, wherein requesting a respective successful build record includes automatically requesting the respective successful build record via a time-based job scheduling utility.

5. The method of claim 1, further comprising:
   generating, at the first one of the plurality of heterogeneous databases, the successful build record upon the completion of a successful build; and
   transmitting the successful build record via the network to the computer system.

6. The method of claim 1, further comprising:
   normalizing the successful build record from a first format associated with at least the first one of the plurality of heterogeneous databases into a second format associated with the dependency database.

7. The method of claim 1, wherein storing the identity of the artifact in the dependency database includes:
   detecting that the artifact is a new type of artifact in the dependency database; and
   adding an indication of the new type of artifact to an artifact type table in the dependency database.

8. The method of claim 1, wherein storing the identity of the artifact in the dependency database includes:
   detecting that the relationship is a new type of relationship in the dependency database; and
   adding an indication of the new type of relationship to a relationship type table in the dependency database.

9. The method of claim 1, wherein the relationship is at least one of (i) a container that depends on an installation manager, or (ii) a container that depends on a package manager.

10. The method of claim 1, wherein the relationship is (i) a package manager that depends on a specification file, (ii) a package manager that depends on a file archive, (iii) an installation manager that depends on a package manager, (iv) an installation manager that depends on an installation manager, or (v) a package manager that depends on an installation manager.

11. A computer system comprising:
    a processor; and
    a memory storing instructions which, when executed by the processor, cause the processor to:

receive, at the computer system via a network, a successful build record that corresponds to a successful build from a first one of a plurality of heterogeneous databases;

extract an identity of an artifact from the successful build record associated with the build, the artifact being an operating system virtualization container;

extract a relationship from the successful build record indicating how the artifact relates to the build; and store the identity of the artifact and the relationship in a dependency database;

receive via the network a second successful build record that corresponds to a second successful build from a second one of a plurality of heterogeneous databases;

extract a second identity of a second artifact from the second successful build record associated with the second build, the second artifact being a virtual machine image;

extract a second relationship from the second successful build record indicating how the second artifact relates to the second build; and store the second identity of the second artifact and the second relationship in the dependency database.

12. The computer system of claim 11, wherein the memory stores further instructions which, when executed by the processor, cause the processor to monitor a message bus in real time for successful build records.

13. The computer system of claim 11, wherein the memory stores further instructions which, when executed by the processor, cause the processor to request successful build records from the first one and the second one of the plurality of heterogeneous databases.

14. The computer system of claim 13, wherein requesting a respective successful build record includes automatically requesting the respective successful build record via a time-based job scheduling utility.

15. The computer system of claim 11, wherein the memory stores further instructions which, when executed by the processor, cause the processor to normalize the successful build record from a first format associated with at least the first one of the plurality of heterogeneous databases into a second format associated with the dependency database.

16. The computer system of claim 11, wherein storing the identity of the artifact in the dependency database includes:

detecting that the artifact is a new type of artifact in the dependency database; and adding an indication of the new type of artifact to an artifact type table in the dependency database.

17. The computer system of claim 11, wherein storing the identity of the artifact in the dependency database includes:

detecting that the relationship is a new type of relationship in the dependency database; and adding an indication of the new type of relationship to a relationship type table in the dependency database.

18. The computer system of claim 11, wherein the relationship is at least one of (i) a container that depends on an installation manager, or (ii) a container that depends on a package manager.

19. The computer system of claim 11, wherein the relationship is (i) a package manager that depends on a specification file, (ii) a package manager that depends on a file archive, (iii) an installation manager that depends on a package manager, (iv) an installation manager that depends on an installation manager, or (v) a package manager that depends on an installation manager.

20. A non-transitory, computer-readable medium storing instructions which, when executed by a processor, cause the processor to:

receive at a computer system via a network a successful build record that corresponds to a successful build from a first one of a plurality of heterogeneous databases;

extract with the computer system an identity of an artifact from the successful build record associated with the build, the artifact being an operating system virtualization container;

extract with the computer system a relationship from the successful build record indicating how the artifact relates to the build; and store the identity of the artifact and the relationship in a dependency database;

receive at the computer system via the network a second successful build record that corresponds to a second successful build from a second one of a plurality of heterogeneous databases;

extract with the computer system a second identity of a second artifact from the second successful build record associated with the second build, the second artifact being a virtual machine image;

extract with the computer system a second relationship from the second successful build record indicating how the second artifact relates to the second build; and store the second identity of the second artifact and the second relationship in the dependency database.

* * * * *